(12) United States Patent
Jakubiec

(10) Patent No.: US 7,330,885 B2
(45) Date of Patent: Feb. 12, 2008

(54) METHOD AND APPARATUS FOR MANAGING DATA TIME-OUTS

(75) Inventor: Christopher M. Jakubiec, Portland, OR (US)

(73) Assignee: Sun Microsystems, Inc., Santa Clara, CA (US)

( * ) Notice: Subject to any disclaimer, the term of this patent is extended or adjusted under 35 U.S.C. 154(b) by 1314 days.

(21) Appl. No.: 10/057,259

(22) Filed: Oct. 25, 2001

(65) Prior Publication Data
US 2003/0084364 A1 May 1, 2003

(51) Int. Cl.
G06F 15/173 (2006.01)
(52) U.S. Cl. ..................................... 709/224
(58) Field of Classification Search ................ 709/101, 709/237, 219, 229, 108, 260, 224
See application file for complete search history.

(56) References Cited

U.S. PATENT DOCUMENTS

| | | | |
|---|---|---|---|
| 5,655,081 A | 8/1997 | Bonnell et al. | |
| 5,768,552 A * | 6/1998 | Jacoby | 345/441 |
| 6,014,710 A * | 1/2000 | Talluri et al. | 709/237 |
| 6,018,759 A * | 1/2000 | Doing et al. | 718/108 |
| 6,243,778 B1 | 6/2001 | Fung et al. | |
| 6,336,138 B1 | 1/2002 | Caswell et al. | |
| 6,359,888 B1 * | 3/2002 | Koch et al. | 370/394 |
| 6,374,282 B1 * | 4/2002 | Bunton et al. | 718/101 |
| 6,401,174 B1 * | 6/2002 | Hagersten et al. | 711/147 |
| 6,473,826 B1 | 10/2002 | Allingham | |
| 6,701,363 B1 * | 3/2004 | Chiu et al. | 709/224 |
| 6,718,413 B1 * | 4/2004 | Wilson et al. | 710/260 |
| 2001/0032263 A1 * | 10/2001 | Gopal et al. | 709/227 |
| 2002/0012011 A1 * | 1/2002 | Roytman et al. | 345/736 |
| 2002/0184361 A1 * | 12/2002 | Eden | 709/224 |

* cited by examiner

Primary Examiner—Jason Cardone
Assistant Examiner—Ajay M Bhatia
(74) Attorney, Agent, or Firm—Meyertons Hood Kivlin Kowert & Goetzel, P.C.; Erik A. Heter (57) ABSTRACT

The present invention provides a method and apparatus for managing data time-outs in a processor-based system. The apparatus includes a scoreboard comprising a plurality of locations adapted to store transaction identifiers, wherein a transaction comprises a first client sending a request to a second client. The apparatus further includes a device adapted to manage the plurality of transaction identifiers in the scoreboard

16 Claims, 6 Drawing Sheets

METHOD AND APPARATUS FOR MANAGING DATA TIME-OUTS

BACKGROUND OF THE INVENTION

1. Field of the Invention

This invention relates generally to a processor-based system, and, more particularly, to managing data time-outs within a processor-based system.

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, contain one or more processors and one or more cache memory elements that store copies of frequently used data in close proximity to the one or more processors to provide the one or more processors with faster access to the data. The one or more processors may also include one or more associated non-cache memory elements that may store larger blocks of data. The mid-range server system may also have a plurality of input/output (I/O) boards that may manage I/O cards, such as peripheral component interface cards and optical cards that may couple to devices such as disk memories, CD-ROMs, tape drives, and the like.

In some embodiments, it may be desirable to configure one or more of the plurality of system boards and/or I/O boards as one or more domains, where a domain, for example, may act as a separate machine by running its own instance of an operating system to perform one or more of the configured tasks. For example, in one embodiment, one domain may be configured as a web server, another as a database server, and a third as a network server. One or more processors on one or more of the plurality of system boards and/or I/O boards in a domain may access data stored in the non-cache memory elements in the domain. Although an individual domain may act as a separate machine, components on a system board in a first domain may also communicate with components in a second domain through an inter-domain network (IDN).

In a typical network-centric environment, a plurality of data communications may occur along many paths of communication. Each path of communication may carry a variety of information, including data, requests for data, and the like. For example, a processor on a system board may provide data to an I/O device located on an I/O board. However, during data communications, requested data may not always be provided to the requesting component. The data may be lost, destroyed, or altered due to human, machine, or other error. In some embodiments, the requesting component may wait an indefinite amount of time for data that may not be available. This could result in a variety of problems during the operation of the mid-range server system. For example, the mid-range server system may cease operation or create a backlog of subsequent data communications operations, which lessens the efficiency of the system. Furthermore, resources allocated by the mid-range server system to perform the system data communications may be wasted in an attempt to recover the lost data. This may be problematic in time-critical as well as resource-critical applications. Consequently, there is a need for an efficient system for managing data time-outs.

SUMMARY OF THE INVENTION

In one aspect of the instant invention, an apparatus is provided for managing data time-outs in a processor-based system. The apparatus includes a scoreboard comprising a plurality of locations adapted to store transaction identifiers, wherein a transaction comprises a first client sending a request to a second client. The apparatus further includes a device adapted to manage the plurality of transaction identifiers in the scoreboard.

In one aspect of the present invention, a method is provided for managing data time-outs in a processor-based system. The method includes storing at least one transaction identifier in at least one of a plurality of locations in a scoreboard, wherein each transaction comprises a first client sending a request to a second client in a system. The method further includes timing a selected duration and initiating a time-out sequence if the selected duration is substantially longer than a predetermined latency period.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within t the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
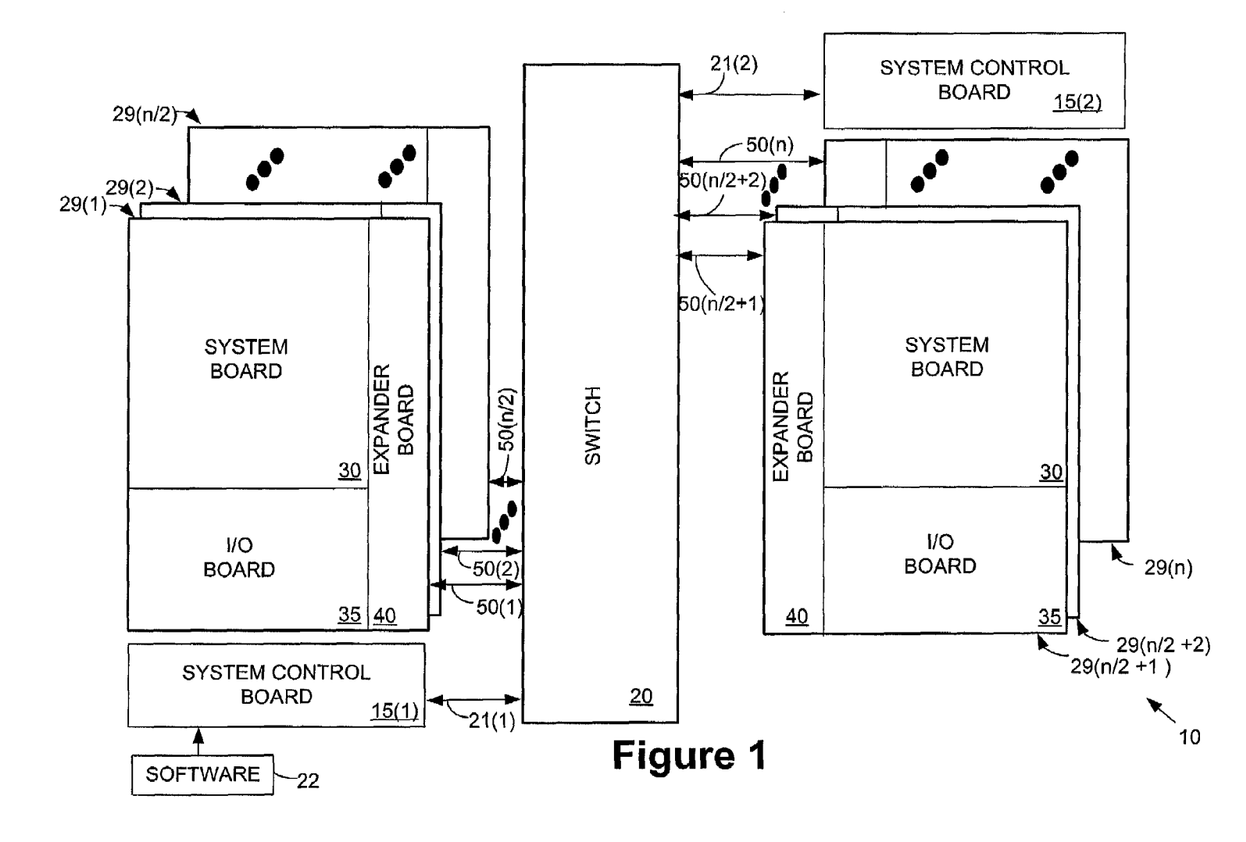
FIG. 1 shows a stylized block diagram of a system, in accordance with one embodiment of the present invention.

Referring now to FIG. 1, a block diagram of a system 10 in accordance with one embodiment of the present invention is illustrated. The system 10, in one embodiment, includes a plurality of system control boards 15(1-2) that are coupled to a switch 20. For illustrative purposes, lines 21(1-2) are utilized to show that the system control boards 15(1-2) are coupled to the switch 20, although it should be appreciated that, in other embodiments, the boards 15(1-2) may be coupled to the switch in any of a variety of ways, including by edge connectors, cables, or other available interfaces.

In the illustrated embodiment, the system 10 includes two control boards 15(1-2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate replaceable system control board. In one embodiment, during any given moment, generally one of the two system control boards 15(1-2) actively controls the overall operations of the system 10.

The system 10, in one embodiment, includes a plurality of system board sets 29(1-n) that are coupled to the switch 20, as indicated by lines 50(1-n). The system board sets 29(1-n) may be coupled to the switch 20 in one of several ways, including edge connectors or other available interfaces. The switch 20 may serve as a communications conduit for the plurality of system board sets 29(1-n), half of which may be connected on one side of the switch 20 and the other half on the opposite side of the switch 20. The switch 20, in one embodiment, may be an 18×18crossbar switch that allows system board sets 29(1-n) and system control boards 15(1-2) to communicate, if desired. Thus, the switch 20 may allow the two system control boards 15(1-2) to communicate with each other or with other system board sets 29(1-n), as well as allow the system board sets 29(1-n) to communicate with each other.

The system board sets 29(1-n), in one embodiment, comprise one or more boards, including a system board 30, an I/O board 35, and an expander board 40. The system board 30 may include processors, cache memories, and non-cache memories for executing, in one embodiment, applications, including portions of an operating system. The I/O board 35 may manage I/O cards, such as peripheral component interface cards and optical cards, which may be installed in the system 10. The expander board 40, in one embodiment, generally acts as a multiplexer (e.g., 2:1 multiplexer) to allow both the system and I/O boards 30, 35 to interface with the switch 20, which, in some instances, may have only one slot for interfacing with both boards 30, 35.

In one embodiment, the system board 30 and the I/O board 35 may transmit data or requests for data to the expander board 40. The expander board 40 may, in one embodiment, transmit the data request to the switch 20, which may then broadcast the data request to clients in the system 10. The system board 30 and the I/O board 35 may similarly receive requested data from clients. Clients may include, but are not limited to, processors, memories, and I/O devices on the system boards 30 and the I/O boards 35 in the system 10. The system board 30 and the I/O board 35 may also transmit requested data through the expander board 40 and the switch 20 to requesting clients in the system 10. Hereinafter, exchanges of information between clients in the system 10 are referred to as "transactions." Transactions may comprise, but are not limited to, such tasks as transmitting data, requesting data, receiving data, receiving requests for data, and the like.

During a transaction, the system 10 may, in one embodiment, attach a transaction data identifier comprising such elements as a client tag, a client ID, and the like to the transaction.

Although not so limited, each client in the system 10 may be identified by a client ID and the client tag may be used to track transactions involving the client. In one embodiment, which is discussed more fully below in conjunction with FIGS. 4-6, a copy of the transaction data identifier may be transmitted to a data scoreboard that may be located on the expander board 40. The transaction data identifier may remain in the data scoreboard until such a time as the data scoreboard may be notified that the transaction is substantially complete, at which time the transaction data identifier may be removed from the data scoreboard. If the transaction data identifier remains in the data scoreboard for longer than a predetermined latency period, a data time-out condition may be initiated.

The data scoreboard may contain a plurality of locations adapted to store a plurality of transaction data identifiers. For example, in one embodiment, a system board set 29(1-n) may comprise 6 components (e.g. a processor, a memory, or an I/O device) and each component on the system board set 29(1-n) may have as many as 16 pending transactions. Thus, the data scoreboard may comprise up to 96 locations that may store transaction data identifiers. As described in more detail below, and in accordance with the present invention, a free-running timer may be coupled to the data scoreboard and used to ascertain whether one or more of the plurality of transaction data identifiers stored in locations in the data scoreboard may have remained in the data scoreboard for longer than a predetermined latency period. The predetermined latency period may, in one embodiment, range from 6 nanoseconds to 28 seconds. By initiating a data time-out sequence when one or more of the plurality of transaction data identifiers remain stored in the data scoreboard for longer than the predetermined latency period, valuable time and system resources may be saved, allowing the system 10 to operate more efficiently.

Figure 2:
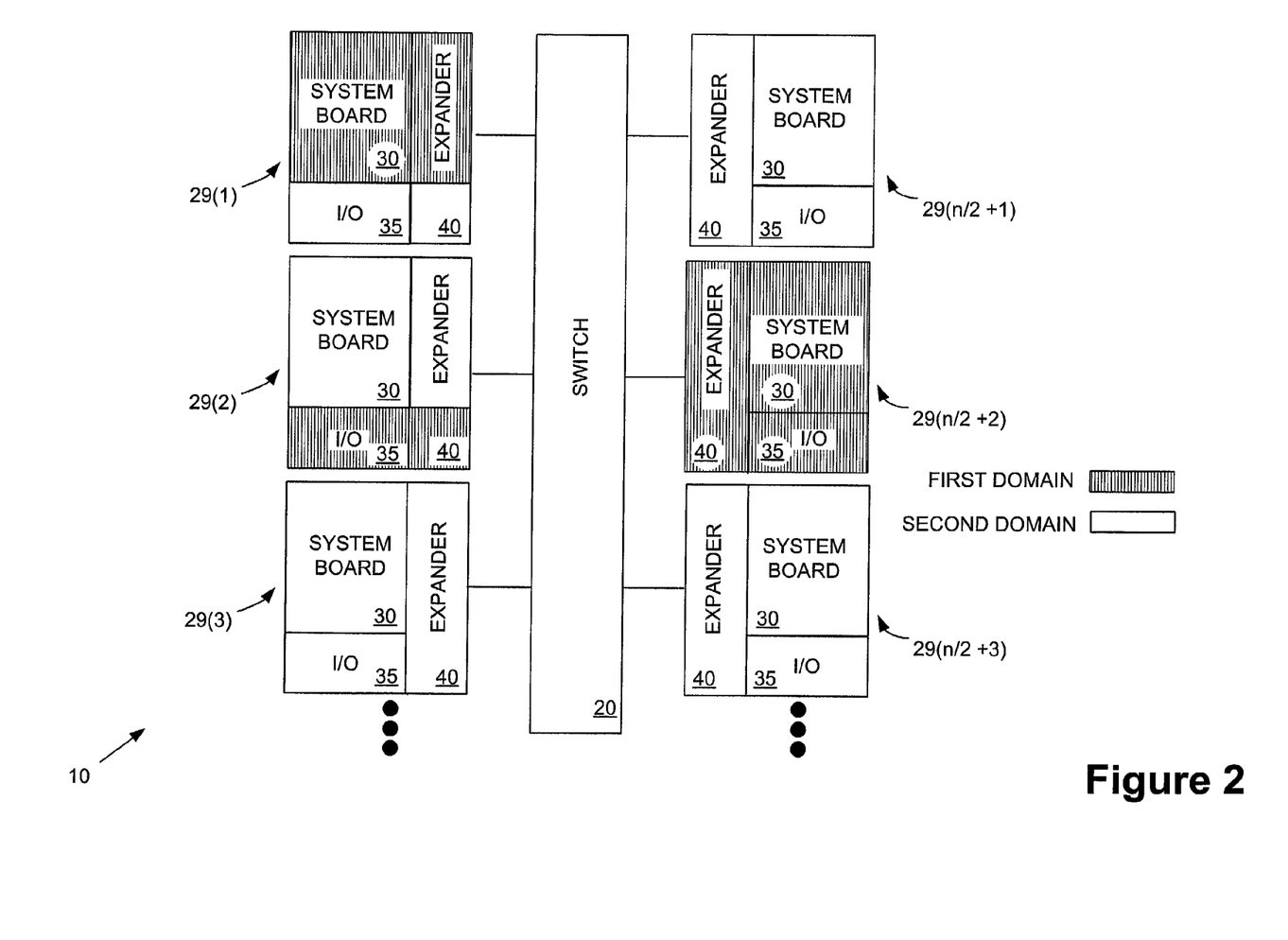
FIG. 2 illustrates a stylized block diagram of an exemplary domain configuration that may be employed in the system of FIG. 1, in accordance with one embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1-n), one or more boards (e.g., system board 30, I/O board 35) from selected system board sets 29(1-n), or a combination thereof. Each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system).

Although not necessary, it may be possible to define each system board set 29(1-n) as a separate domain, in which case the system 10 may conceivably have up to "n" (i.e., the number of system board sets) different domains. When two boards (e.g., system board 30, I/O board 35) from the same system board set 29(1-n) are in different domains, such a configuration is referred to as a "split expander." The expander board 40 of the system board sets 29(1-n), in one embodiment, keeps the transactions separate for each domain. No physical proximity may be needed for boards in a domain.

Clients (e.g. processors, memories, or I/O devices) on the system board 30 and the I/O board 35 in a domain may communicate with clients on other boards through the switch 20. For example, in one embodiment, a client I/O device (not shown) on the I/O board 35 of the system board set 29(2) may request data that may be stored in a memory (not shown) on the system board 30 of the system board set 29(n/2+2) by transmitting a data request through the switch 20. The system board 30 of the system board set 29(n/2+2) may receive the data request and subsequently transmit the requested data to the I/O board 35 of the system board set 29(2) through the switch 20. In one embodiment, transactions may also be transmitted between clients that may be located in different domains.

Figure 3:
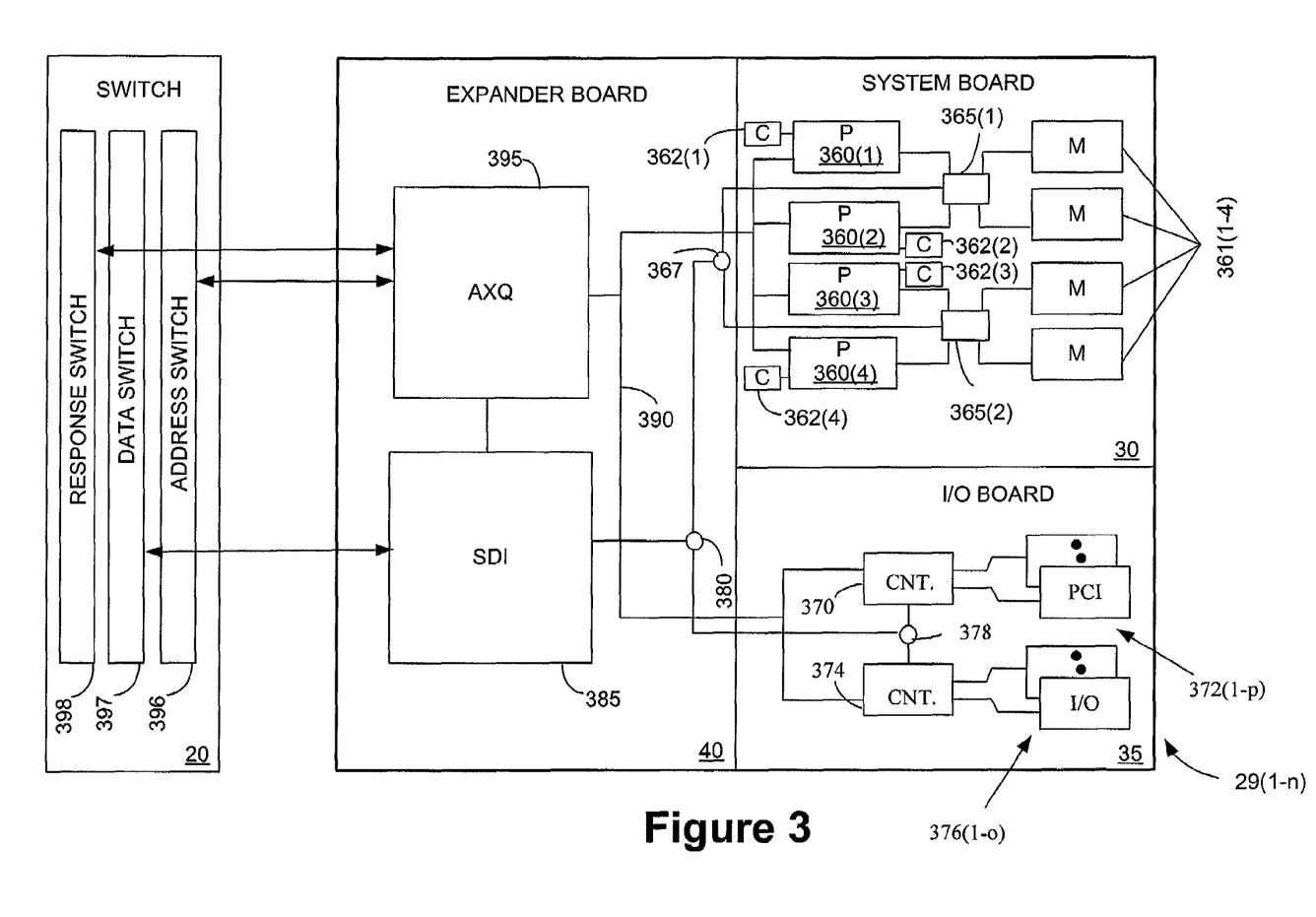
FIG. 3 depicts a stylized block diagram of one system board set that may be employed in the system of FIG. 1, in accordance with one embodiment of the present invention.

Referring now to FIG. 3, a block diagram of the system board set 29(1-n) coupled to the switch 20 is illustrated, in accordance with one embodiment of the present invention. The system board 30 of each system board set 29(1-n) in the illustrated embodiment includes four processors 360(1-4), with each of the processors 360(1-4) having a non-cache memory 361(1-4). In one embodiment, each of the processors 360(1-4) may also be coupled to a respective cache memory 362(1-4). In other embodiments, each of the processors 360(1-4) may have more than one associated cache memories, wherein some or all of the one or more cache memories may reside within the processors 360(1-4).

Although not so limited, the I/O board 35 of each system board set 29(1-n) in the illustrated embodiment may include a controller 370 for managing one or more of the PCI cards that may be installed in one or more PCI slots 372(1-p). In the illustrated embodiment, the I/O board 35 also includes a second controller 374 for managing one or more of I/O cards that may be installed in one or more I/O slots 376(1-o). The I/O slots 376(1-o) may receive optics cards, network cards, and the like. The two controllers 370, 374 of the I/O board 35 may, in one embodiment, be coupled to a data switch 378.

Clients on the system board 30 (e.g. processors 360(1-4) and memories 361(1-4), 362(14)) and the I/O board 35 (e.g. PCI cards 372(1-p), I/O devices 376(1-o), and controllers 370, 374) may submit transactions to other clients in a domain. The transactions may, in one embodiment, be processed by the expander board 40. For example, in one embodiment, two five-port, dual-data switches 365(1-2) may connect the processor/memory pairs (e.g., processors 360(1-2)/memories 361(1-2) and processors 360(3-4)/memories 361(3-4)) to a board data switch 367 on the expander board 40. The output signal from the switch 378 of the I/O board 35 and from the switch 367 of the system board set 29(1-n) may be transmitted to a switch 380 on the expander board 40, which may receive the output signal and provide it to a System Data Interface (SDI) 385. A separate address path 390 is shown from the processors 360(1-4) and the controllers 370, 374 to an Address Expander Queue (AXQ) 395 on the expander board 40.

The SDI 385 and the AXQ 395 may, in one embodiment, be coupled to components of the switch 20 including, but not limited to, an address switch 396, a data switch 397, and a response switch 398 for transmitting respective address, data, and control signals. Thus, in one embodiment, the switch 20 may comprise three 18×18 crossbar switches that provide a separate data path, address path, and control signal path to allow intra- and inter-domain communications. Using separate paths for data, addresses, and control signals, in one embodiment, may reduce the interference among traffic on the data path, address path, and control signal path. In one embodiment, the switch 20 may provide a bandwidth of about 43 Gigabytes per second. In other embodiments, a higher or lower bandwidth may be achieved using the switch 20.

The SDI 385 and the AXQ 395 may, in one embodiment, manage the transactions that may involve clients on the system board 30 and the I/O board 35. For example, to process a task, a processor 360(1-4) on the system board 30 in the domain may request data from a memory (not shown) on a second board. The data request may, in one embodiment, be transmitted to the AXQ 395, which may attach a transaction data identifier to the data request and may then transmit the data request and the transaction data identifier to an address switch 396 in the switch 20. The AXQ 395 may also, in one embodiment, transmit a copy of the transaction data identifier to the SDI 385, which may store the transaction data identifier in a data scoreboard 400 (shown in FIG. 4) for a predetermined latency period.

The address switch 396 may then, in one embodiment, broadcast the data request along the switch 20 to the memory (not shown) on the second board, which may, upon receiving the data request, transmit the requested data to the SDI 385 along the data switch 397 in the switch 20. The second board may also notify the AXQ 395 that the requested data has been transmitted to the SDI 385 by transmitting a response to the AXQ 395 along the response switch 398 in the switch 20. The SDI 385 may then transmit the requested data to the processor 360(1-4) and erase the stored transaction data identifier from the data scoreboard 400 (shown in FIG. 4).

However, the requested data may not always be substantially successfully transmitted to the SDI 385. The requested data may be lost, destroyed, or altered due to human, machine, or other error. Thus, after receiving a copy of the transaction data identifier from the AXQ 395, the SDI 385 may, in one embodiment, wait a predetermined latency period for the requested data to arrive. If the requested data is not substantially successfully transmitted to the SDI 385 before the end of the predetermined latency period, the SDI 385 may initiate a data time-out sequence, as described in more detail below.

Figure 4:
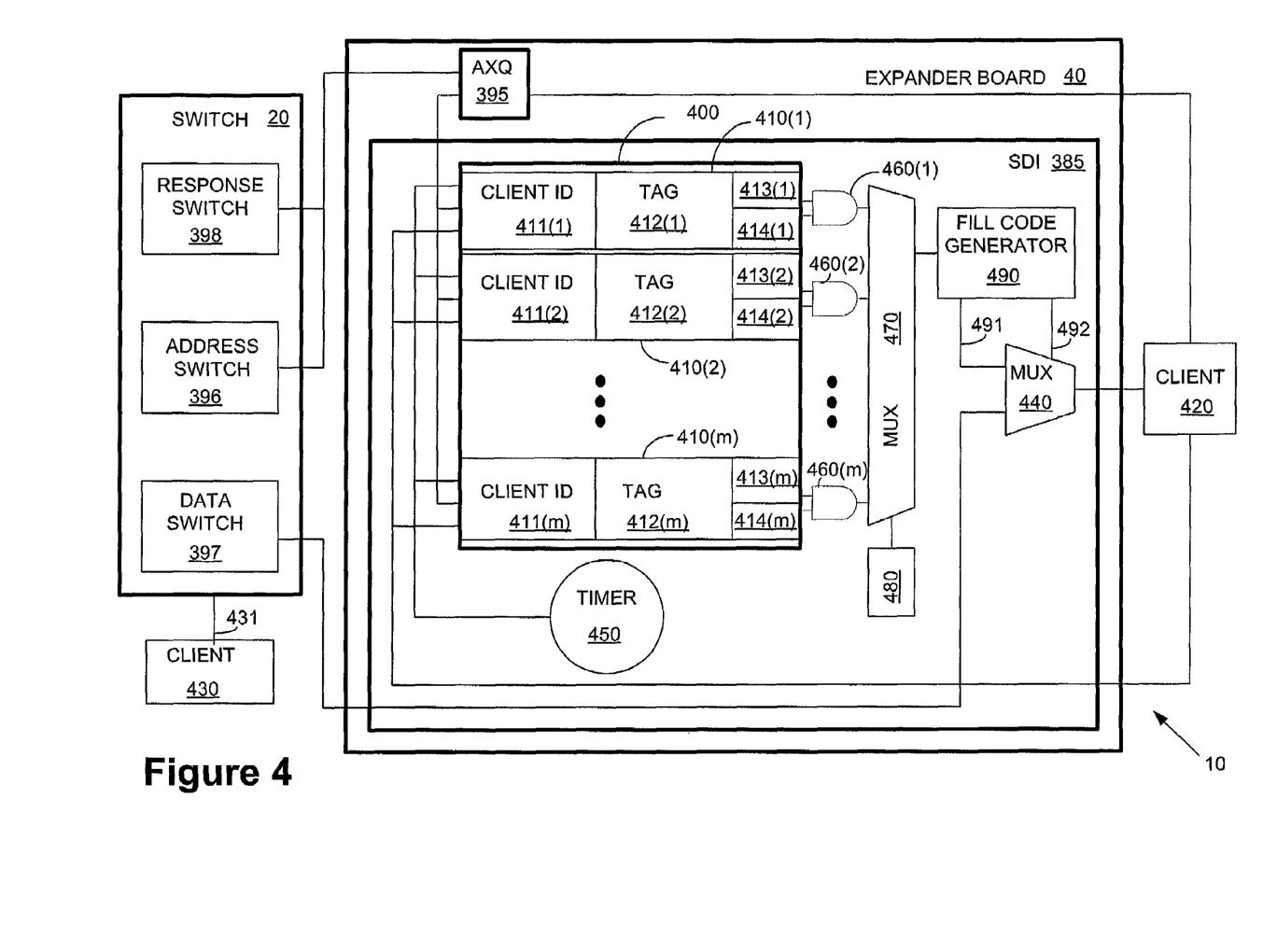
FIG. 4 shows a data scoreboard that may be used in the system board set depicted in FIG. 5, in accordance with one embodiment of the present invention.

Referring now to FIG. 4, a stylized block diagram illustrating the data scoreboard 400 on the expander board 40 in the system 10 is shown. The data scoreboard 400 may, in one embodiment, provide a plurality of locations 410(1-m) adapted to receive and store transaction data identifiers. As described in more detail below, transaction data identifiers may comprise, but are not limited to, elements such as a client ID 411(1-m), a client tag 412(1-m), a first timer flag 413(1-m), and a second timer flag 414(1-m).

The transaction data identifiers stored in the locations 410(1-m) may be used to manage transactions in the system 10. For example, in one embodiment, a first client 420, which may comprise, but is not limited to, a processor or a memory on a system board 30 or an I/O device on an I/O board 35, may initiate a transaction, such as a request for data from a second client 430, by transmitting a signal to the AXQ 395. The AXQ 395 may, in one embodiment, transmit transaction data identifiers comprising the identity of the first client 420 and the second client 430 to the data scoreboard 400. The data scoreboard 400 may then store the identity of the first client 420 and the second client 430 in the client tag 412(1-m) and the client ID 411(1-m), respectively, of one of the plurality of locations 410(1-m).

Upon receiving the signal from the first client 420, the AXQ 395 may also, in one embodiment, transmit a data request signal to the address switch 396 in the switch 20. The address switch 396 may then transmit the data request signal to the second client 430. In the interest of clarity, FIG. 4 depicts a line 431 coupling the second client 430 to the switch 20. However, it should be appreciated that the second client 430 may be coupled to the switch by any one of a variety of means including, but not limited to, coupling the second client 430 to the expander board 40 which may then be coupled to the switch 20 in the manner described above.

The second client 430 may receive the data request from the address switch 396 and may, in one embodiment, transmit the requested data to the data switch 397 in the switch 20. Upon substantially receiving the data from the second client 430, the data switch 397 may, in one embodiment, transmit the data to a multiplexer 440 in the SDI 385 on the expander board 40, which may then transmit the data to the first client 420. When the first client 420 has substantially received the requested data, the first client 420 may, in one embodiment, notify the data scoreboard 400 that the transaction is substantially complete. The data scoreboard 400 may then clear, or otherwise make available for further use, the client ID 411(1-m) and the client tag 412(1-m) of the location 410(1-m).

However, during a transaction, the second client 430 may not substantially provide the requested data to the first client 420. For example, the data request may be lost, destroyed, or altered due to human, machine, or other error before the data request substantially arrives at the second client 430. For another example, the requested data may similarly be lost destroyed, or altered due to human, machine, or other error before the requested data substantially reaches the first client 420. If the requested data is not substantially transmitted to the first client 420, the first client 420 may, in one embodiment, remain idle until it receives the requested data. For example, the first client 420 may be a processor that may request data to perform a task. In one embodiment, the processor may not be able to perform the task until the requested data is substantially received and consequently may remain idle. Thus, it may be desirable, in one embodiment, to generate fill code that may be transmitted to the first client 420 after a predetermined latency period has substantially expired. As will be appreciated by persons of ordinary skill in the art, fill code may be data that does not necessarily correspond to the requested data but that may be transmitted to the first client 420 and substantially permits the first client 420 to proceed with the task. Fill code may also, in one embodiment, include data that notifies the first client 420 that the requested data was not substantially provided by the second client 430.

To monitor approximately how long a client may have been idle, in one embodiment, a timer 450 may be coupled to the plurality of locations 410(1-m) in the data scoreboard 400. The timer 450 may take any of a variety of forms without departing from the scope of the instant invention. For example, the timer 450 may take the form of a free-running timer 450. The free-running timer 450 may be adapted to cycle away from a zero-point and back again approximately once during a predetermined period approximately equal to the latency period. A data time-out sequence may be initiated if the information remains stored in one or more of the plurality of locations 410(1-m) of the data scoreboard 400 for substantially longer than the predetermined latency period.

As described in more detail below, the SDI 385 may also comprise logic elements that may be adapted to detect data time-outs and initiate a data time-out sequence. Although not so limited, these elements may include a plurality of logic gates 460(1-m), a multiplexer 470, an arbiter 480, and a fill-code generator 490 that may be coupled to the multiplexer 440. In the interest of clarity, two lines 491, 492 are utilized to depict the coupling of the fill-code generator 490 and the multiplexer 440. It should, however, be appreciated that the fill-code generator 490 may be coupled to the multiplexer by any means known to those skilled in the art having benefit of the present disclosure.

Figure 5:
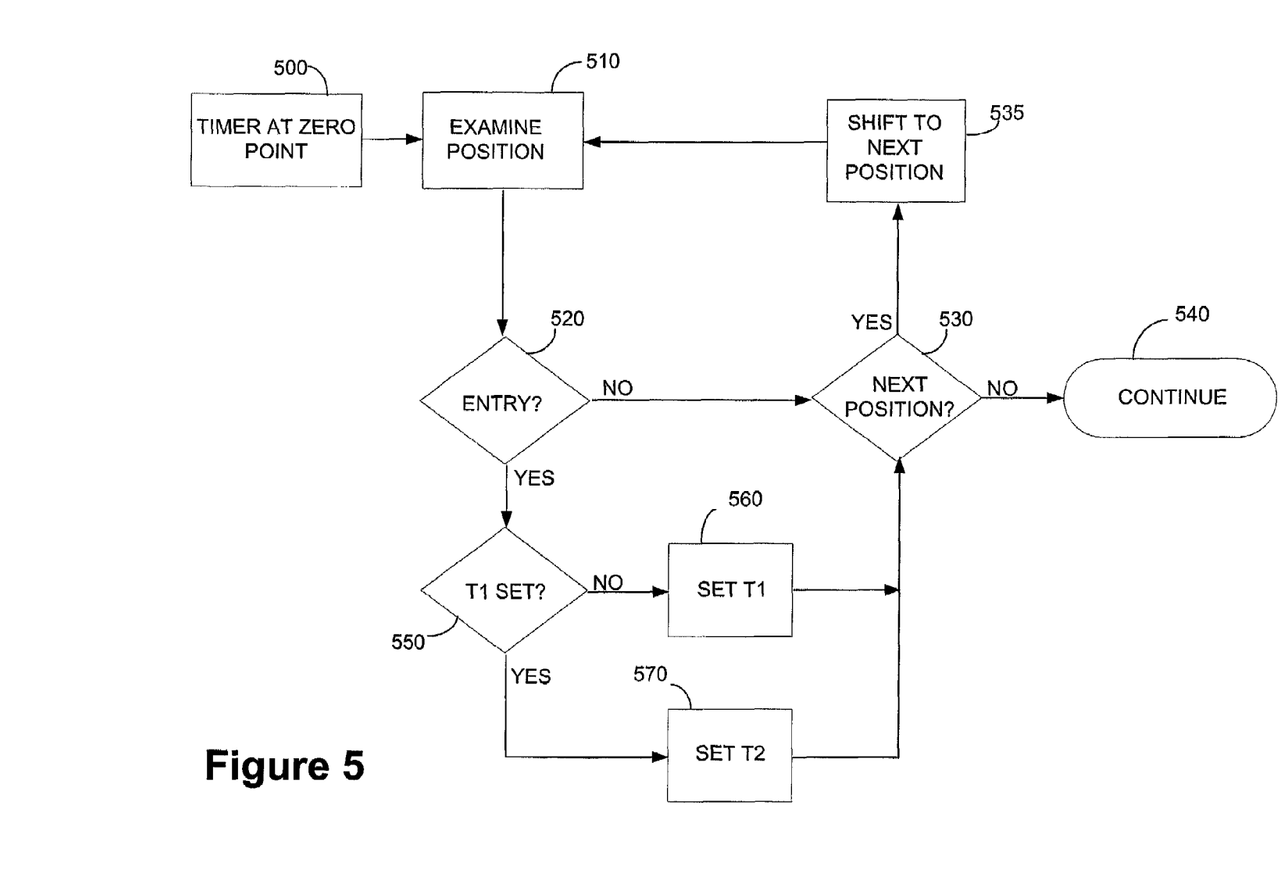
FIG. 5 shows a flow diagram that illustrates a method that may be used to detect data time-outs in the data scoreboard depicted in FIG. 4; in accordance with one embodiment of the present invention.

Turning now to FIG. 5, a flow diagram that illustrates a method that may be used to approximately synchronously detect data time-outs is shown. When the free-running timer 450 has cycled (at 500) substantially back to the zero-point, the free-running timer 450 may substantially simultaneously examine (at 510) the plurality of locations 410(1-m) in the data scoreboard 400. In one embodiment, if the free-running timer 450 does not detect (at 520) an entry at any of the locations 410(1-m), the free-running timer 450 may, in one embodiment, continue (at 540) until it has substantially cycled back to the zero point.

However, if the free-running timer 450 detects (at 520) at least one entry in the locations 410(1-m) then the free-running timer 450 may examine (at 550) the first timer flag 413(1-m). If the first timer flag 412(1-m) has not been set, that may indicate that the transaction stored in the location 410(1-m) may have been initiated in the previous cycle of the free-running timer 450. In that case, the free-running timer 450 may set (at 560) the first timer flag 412(1-m). If the first timer flag 412(1-m) has been set, indicating that the transaction may have been idle for more than one cycle of the free-running timer 450, the free-running timer 450 may set (at 570) the second timer flag 413(1-m) to indicate that the corresponding data transaction may have been idle for substantially more than one timer cycle. It may then be desirable to initiate a data timeout sequence for that transaction.

Referring back now to FIG. 4, the first and second timer flags 412(1-m), 413(1-m) may, in one embodiment, be coupled to one of a plurality of logic gates 460(1-m), which may be coupled to a multiplexer 470. When the free-running timer 450 has set both the first and the second timer flags 412(1-m), 413(1-m) of one of the plurality of locations 410(1-m), the corresponding logic gate 460(1-m) may assert a positive signal to the multiplexer 470. The multiplexer 470 may, in one embodiment, use the positive assertion to initiate a data time-out sequence.

Figure 6:
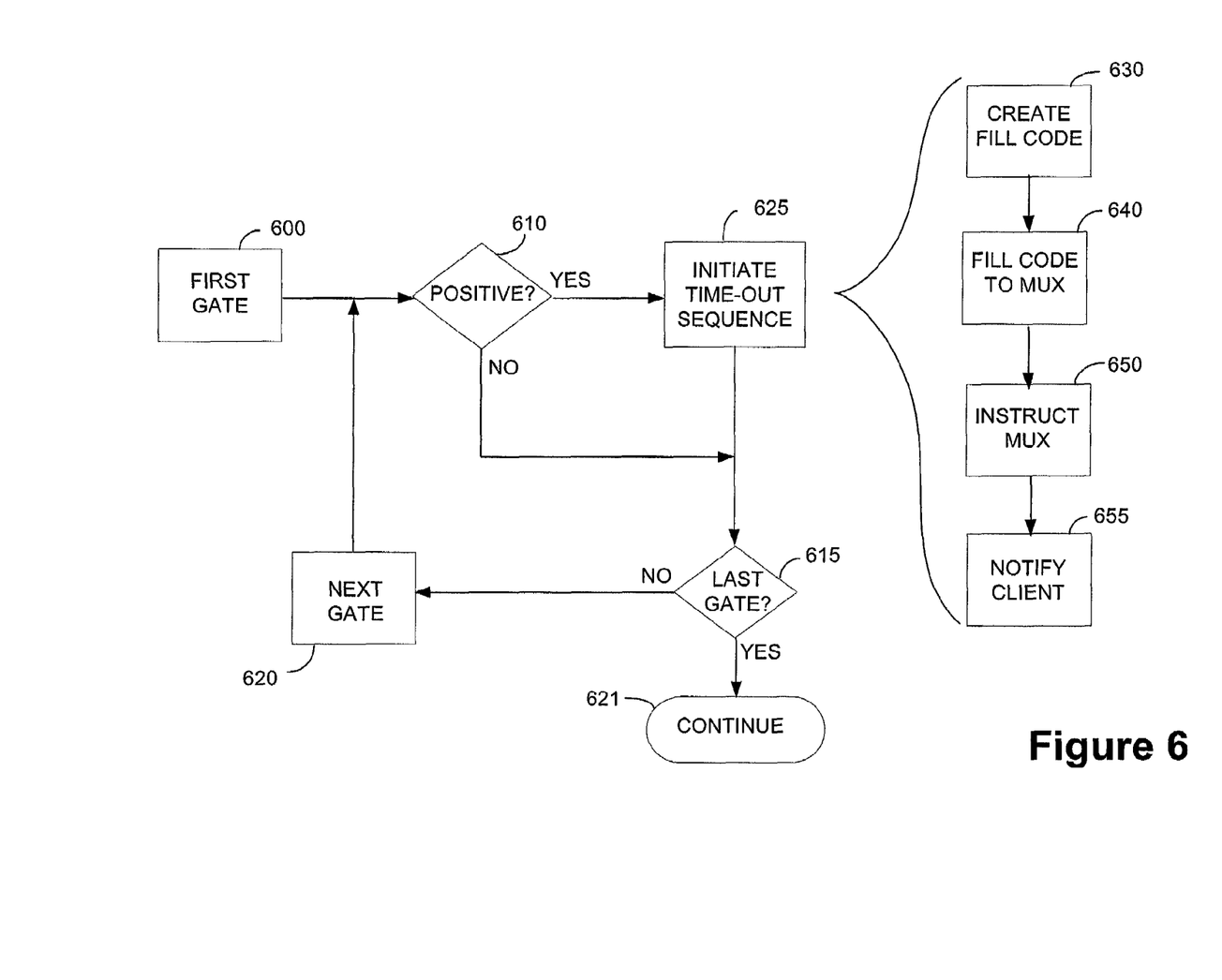
FIG. 6 depicts a flow diagram that illustrates an exemplary data time-out sequence that may be initiated by the data time-out that may be detected by the method illustrated in FIG. 5, in accordance with one embodiment of the present invention.

Turning now to FIG. 6, a flow diagram that illustrates a method of initiating a data time-out sequence is shown. In one embodiment, substantially after the plurality of locations 410(1-m) have been updated by the free-running timer 450, the arbiter 480 may check (at 600) the assertion of the first logic gate 460(1). If the multiplexer 470 determines (at 610) that the logic gate 460(1) may have made a negative assertion, the arbiter 480 may check (at 615) whether there may be more logic gates 460(1-m) to examine. If the arbiter detects (at 615) additional gates, the arbiter 480 may shift (at 620) to the next logic gate (e.g. the logic gate 460(2)). If, however, the arbiter 480 finds (at 615) that substantially all of the logic gates 460(1-m) have been examined, the arbiter 480 may then wait (at 621) until the free-running timer has substantially completed the next timer cycle.

The multiplexer 470 may, however, detect (at 610) a positive assertion from the first logic gate 460(1). The multiplexer may then, in one embodiment, transmit the positive assertion to the fill-code generator 490, which may then initiate (at 625) a data time-out sequence.

The data time-out sequence may comprise creating (at 630) fill code to replace the data requested by the first client 420. Fill code may, in one embodiment, comprise entering 0 in all of the bits of the requested data. It should, however, be appreciated that, in alternative embodiments, the fill code may comprise any suitable data, as discussed above in conjunction with FIG. 4. The fill code generator 490 may then transmit (at 640) the fill code to a multiplexer 440 along the path indicated by line 491. The fill code generator 490 may also transmit a signal along the path indicated by the line 492 to instruct (at 650) the multiplexer 440 to transmit the fill code to the first client 420. In one embodiment, the multiplexer 440 may also notify (at 655) the first client 420 that a time-out has occurred and that the requested data has been replaced by fill code. The arbiter 480 may then check (at 615) whether there may be more logic gates 460(1-m) to examine and, if so, the arbiter 480 may shift (at 620) to the next logic gate 460(1-m). If not, the arbiter 480 may, in one embodiment, wait (at 621) until the free-running timer has substantially returned to the zero point.

Referring back again to FIG. 4, the first client 420 may notify the data scoreboard 400 on the SDI 385 that the multiplexer 440 has provided either the requested data or suitable fill code. The data scoreboard 400 may then, in one embodiment, clear the corresponding location 410(1-m). Consequently, by approximately synchronously comparing the one or more of the plurality of client tags 412(1-m) and client IDs 411(1-m) stored in locations 410(1-m) in the data scoreboard 400 to the free-running timer 450, and then providing fill code to clients 420 that may have been idle for more than a predetermined latency period, valuable time and system resources may be saved, allowing the system 10 to operate more efficiently.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
a scoreboard comprising a plurality of locations adapted to store transaction identifiers each associated with a transaction, wherein each transaction comprises a first client sending a request to a second client, and wherein each transaction identifier includes a first timer flag and a second timer flag;
a timer adapted to compare the length of time the transaction identifiers remain in the scoreboard to a predetermined latency period; and
a fill-code generator adapted to initiate a time-out sequence when notified that at least one transaction identifier has remained in the scoreboard for substantially longer than the predetermined latency period.

2. The apparatus of claim 1, wherein the timer is a free-running timer.

3. The apparatus of claim 2, wherein the free-running timer is a cyclical timer adapted to return to a zero-point after the predetermined latency period.

4. The apparatus as recited in claim 2, wherein the free-running timer is configured to examine the first timer flag when the free-running timer reaches a zero point.

5. The apparatus as recited in claim 4, wherein the free-running timer is configured to set the first timer flag when the first timer flag has not been set and set the second timer flag when the first timer flag has been set.

6. The apparatus as recited in claim 5, wherein the free-running timer is configured to determine when a transaction identifier has been stored in the scoreboard for substantially longer than one cycle of the free-running timer by examining the second timer flag.

7. The apparatus of claim 3, wherein the predetermined latency period ranges approximately from 6 nanoseconds to 28 seconds.

8. The apparatus of claim 1, wherein the fill-code generator is adapted to create a fill code and transmit the fill code to the first client when notified by the free running timer that at least one of the transaction identifiers has remained in the scoreboard longer than the predetermined latency period.

9. The apparatus of claim 8, wherein the fill-code generator is further adapted to notify the client that a time-out occurred.

10. A method, comprising:
storing at least one transaction identifier in at least one of a plurality of locations in a scoreboard, wherein the at least one transaction identifier is associated with a transaction, wherein each transaction comprises a first client requesting data from a second client in a system, and wherein each transaction identifier includes a first timer flag and a second timer flag;
detecting approximately synchronously transaction identifiers that have been stored in the scoreboard during the previous period of a free-running timer having a period approximately equal to a predetermined latency period;
determining approximately synchronously when at least one of the transaction identifiers has been stored in the scoreboard for substantially longer than one cycle of the free-running timer;
and initiating approximately synchronously a time-out sequence if the transaction identifier remains in the scoreboard substantially longer than a predetermined latency period.

11. The method of claim 10, wherein detecting transaction identifiers that have been stored in the scoreboard during a previous period of the free-running timer comprises examining the first timer flag when the free-running timer reaches a zero point.

12. The method of claim 11, wherein detecting transaction identifiers that have been stored in the scoreboard during a previous period of the free-running timer further comprises setting the first timer flag when the first timer flag has not been set and setting the second timer flag when the first timer flag has been set.

13. The method of claim 10, wherein determining when a transaction identifier has been stored in the scoreboard for substantially longer than one cycle of the free-running timer comprises determining if the second timer flag has been set when the free-running timer reaches the zero point.

14. The method of claim 10, wherein initiating a time-out sequence comprises notifying a fill-code generator that the transaction identifier in at least one location has remained in the scoreboard for substantially more than one period of the free-running timer.

15. The method of claim 14, wherein initiating a time-out sequence further comprises generating a fill code and transmitting the fill code to the first client.

16. The method of claim 15, wherein initiating a time-out further comprises notifying the first client that a time-out has occurred.

* * * * *